3,051,466
METHOD FOR HEATING GRANULAR SOLIDS
Robert D. Drew, Wenonah, N.J., assignor to Socony
Mobil Oil Company, Inc., a corporation of New York
Filed Jan. 3, 1956, Ser. No. 557,163
1 Claim. (Cl. 263—52)

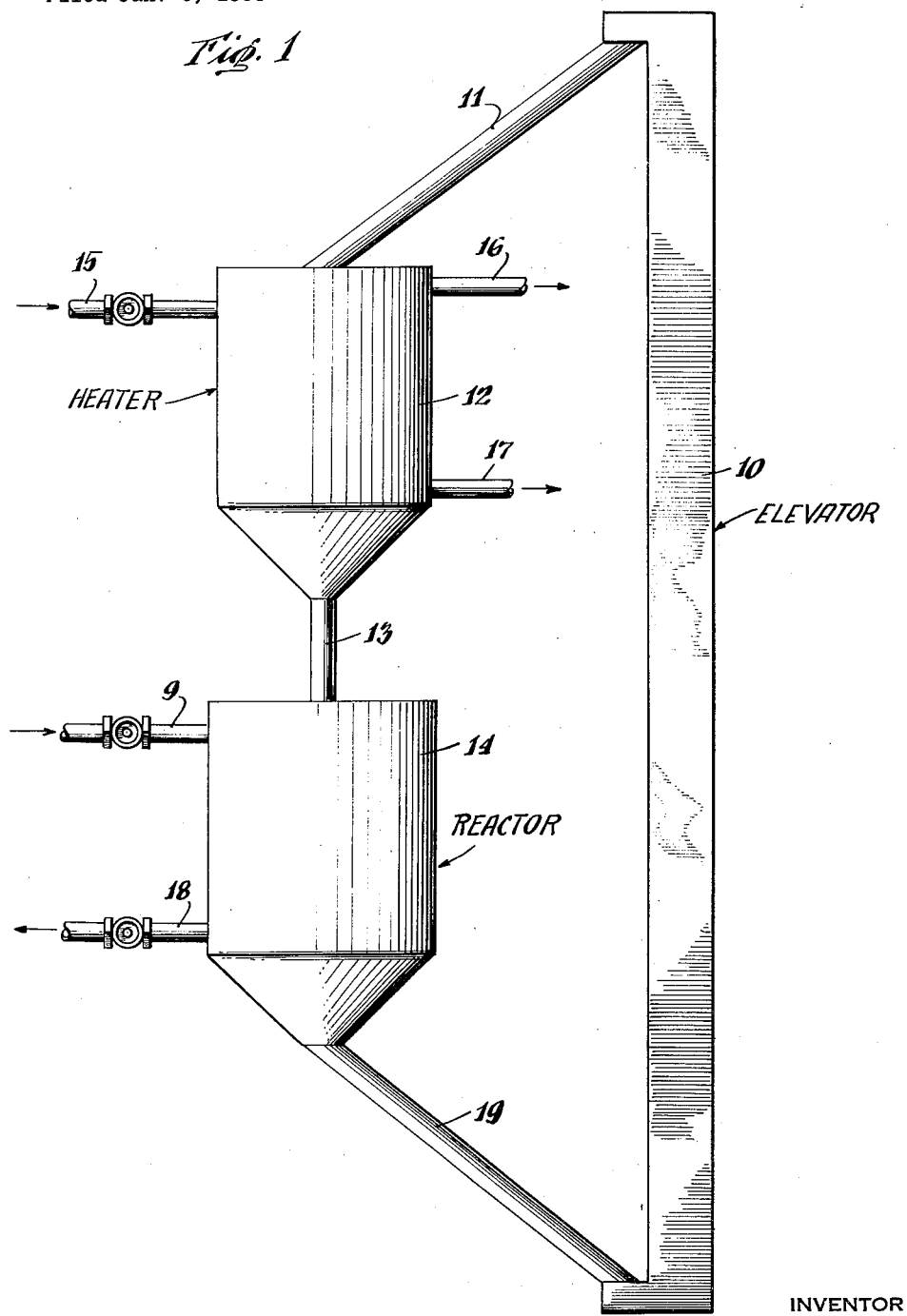

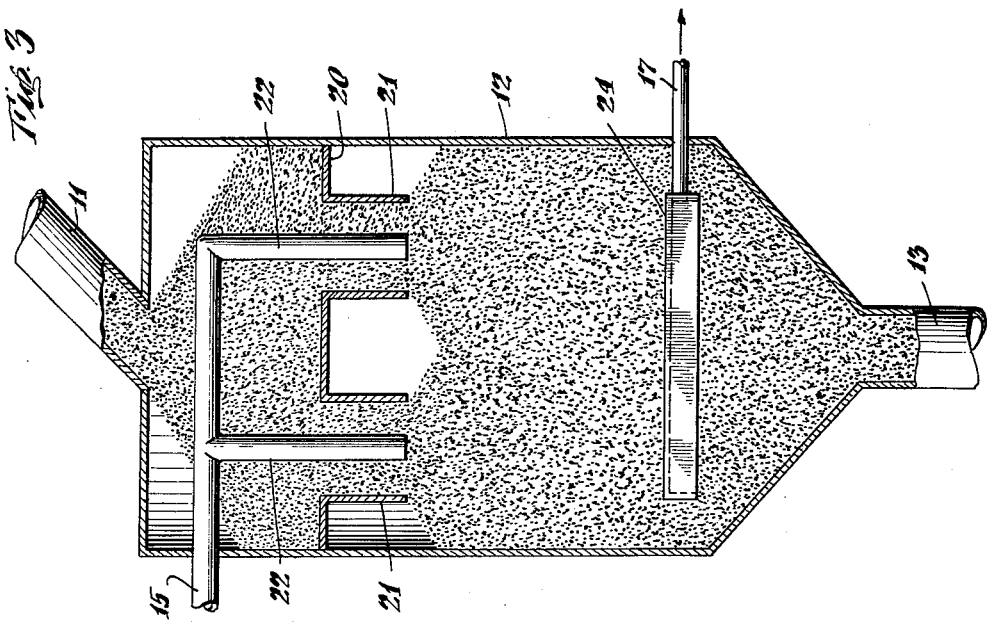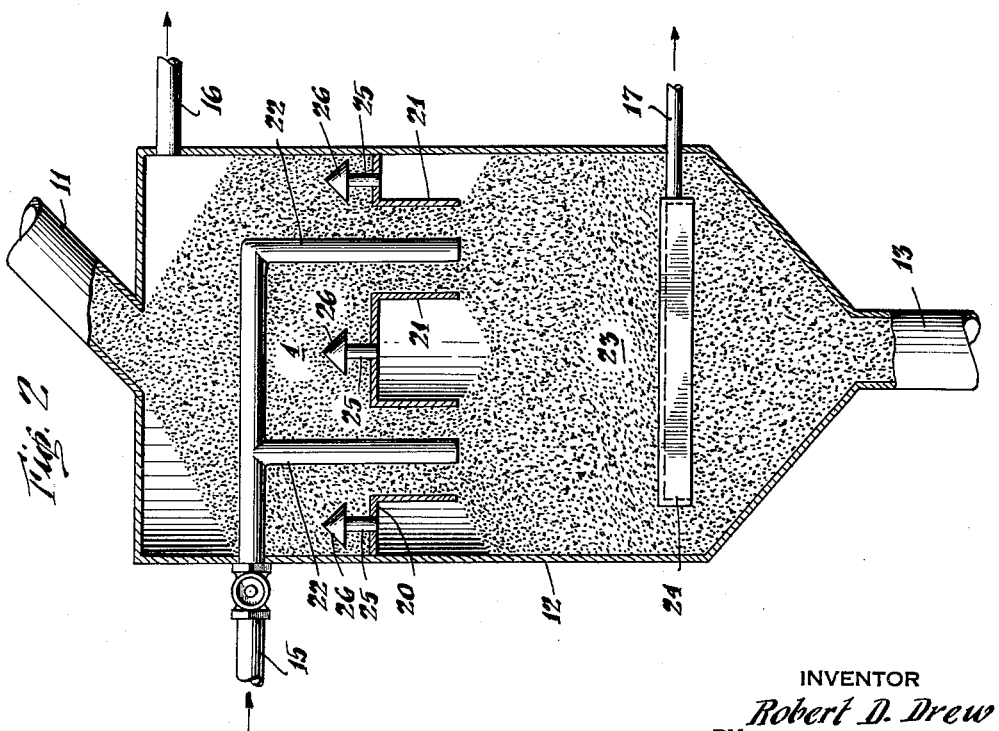

This invention relates to an improvement in a heater through which is circulated a granular inert solid contact material. The invention particularly relates to an improved method for heating a granular solid material to a high temperature for transfer to a reaction zone to provide there sufficient heat for various high temperature reactions. The invention particularly relates, in one of its more specific aspects, to an improved method and apparatus for heating granular inert solids which are circulated as a compact gravitating mass first through a heating zone where the solids are heated to high temperature, and then as a compact mass through a reaction zone where the hot solids are contacted with suitably prepared hydrocarbons to effect thermal reactions in direct contact with the hot solids.

Thermal conversion processes, in which heat is transmitted to inert granular solids and the solids in their high temperature state are contacted with reactant fluids to effect transformation of the fluids under the influence of the high temperature, have been known and used for sometime. Some of these processes, such as the conversion of ethane to ethylene or acetylene, or other unsaturated products, require contact of the reactant material with the hot solids for short periods of time at a very high temperature. The temperature of the solids may be substantially in excess of 1000° F., and may be as high as 2000° F. to 3000° F., or more. It is common practice in these processes to pass the granular solids as a compact gravitating stream through a heating zone and to pass a mixture of combustible gas and oxygen-containing gas through the mass of solids in the heating zone to effect combustion of the combustible gas in the presence of the solid material so that the heat generated by the combustion is imparted directly to the solids, thereby effectively raising the temperature of the solids to the very high temperature needed for the subsequent reaction. The hot solids are then gravitated directly to the reaction zone and passed as a compact gravitating mass through this zone. The reactant materials, such as butane, pentane or other light gases, are introduced into the reaction zone and passed through the mass of solids therein so that they are in contact with the hot solids for a period of time sufficient to cause the desired conversion to unsaturates and the reaction products are then removed from the reaction zone, generally to a quench zone where the temperature of the reaction products is quickly lowered to prevent undesired side reactions. During the passage of the hot solids through the reaction zone, the solids give up heat and thereby drop in temperature and, in addition, an accumulation of carbonaceous material is formed on the surface of the solids. The solids are removed from the bottom of the reaction zone and transferred back to the top of the heating zone. While passing through the heating zone, the solids are re-heated both because of the direct contact of the solids with the combustion gases therein and also because the carbonaceous material formed on the surface of the solids in the reaction zone is burned by contact with the combustion-supporting gas, such as air.

In continuous processes of this type, the heater or heating zone is maintained at a substantially elevated temperature and there has been a problem connected with introducing the mixture of combustion-supporting gas and combustible gas into the bed of solids in the reaction zone without causing localized overheating of both the inert solid particles and the metal members within the heater at or near the region where the gaseous mixture is introduced into contact with the solid particles. The heater is generally a cylindrical upright vessel with one or more conduits attached to the top thereof for introduction of the solid particles into the top of the vessel and an outlet in the bottom of the vessel for the withdrawal of the particles therefrom. Various types of gas introduction members have been used within the vessel and generally, these members involve some form of perforate refractory arch, or refractory gas inlet members. These refractory members or refractory inlets have been necessary to prevent localized overheating at the gas introduction point although they are of expensive construction, are cumbersome and, hence, undesirable.

The solids heat exchange material, which is generally used in these processes, is of the granular particle size and generally in the neighborhood of ⅛ inch in diameter to about one inch in diameter, although particles of about ¼ inch in diameter are generally preferred. The particles are generally substantially inert being utilized almost exclusively as a heat carrying medium. The particles are formed of various types of refractory material which will withstand very high temperatures without fracturing or crumbling in the continuous moving bed process. Various metal alloys have ben used as well as ceramic material. Other inert material, such as alumina, zirconia or mullite, may be used as the granular particles in this process. While the particles may have some catalytic action for various specific purposes, the general practice is to use particles which are substantially inert.

An object of this invention is to provide an improved heating method for raising the temperature of granular solids rapidly in a moving bed process.

A further object of this invention is to provide improved method of heating granular solids passed in compact form through a heater so that localized overheating of the solids and the various components of the heater is avoided.

A further object of this invention is to provide in a heater through which granular solids are passed as a compact mass, an economical and efficient arrangement for introducing a mixture of combustible and oxygen-supporting gases which prevents localized overheating and permits uniform temperature to prevail throughout substantial portions of the heater. These and other objects of the invention will be made clear in the more detailed portions of the specification.

One of the essential aspects of this invention involves passing the granular inert material downwardly as a compact mass through the heating vessel, and baffling the flow of the solids during downward transfer at some level into passages of substantially smaller cross-section than that of the heating vessel, so that the vertical flow rate of the solids in the passages is substantially higher than the vertical flow rate of the solids in the remainder of the vessel. A mixture of the heating gas and air is piped into the vessel through pipes which terminate well within the passages of high solids flow. By this expedient, even though combustion occurs within the passages, excessive overheating of the gas pipe is avoided by the rapid flow of the solids surrounding the pipes, whereby the solids carry the excess heat rapidly to other portions of the vessel.

FIGURE 1 is a vertical elevation of a complete moving bed system, in which the inert particles are gravitated as a compact mass first through a heating zone, wherein the temperature of the solids is raised, and then through a reaction zone where the hot solids are contacted with the reaction gas.

FIGURE 2 is a vertical elevation of a heater for use in the system shown on FIGURE 1.

FIGURE 3 is a vertical elevation of an alternate heating vessel for similar use.

Referring now to FIGURE 1, there is shown an elevator 10 for transporting the granular particles from the bottom of the system to the top thereof. This elevator may be of the conventional continuous bucket type, or may be a pneumatic lift, or Redler type elevator known to the art. The solids are discharged from the top of the elevator 10 to pass downwardly through the conduit 11, into the top of the heater 12. The solids gravitate as a compact mass through the heater 12 and are withdrawn from the bottom thereof through the conduit 13, which connects to the top of the reactor 14. A mixture of combustible gas and combustion-supporting gas is supplied to the heater 12 through the conduit 15. Various gases may be used for this purpose and it is even possible to use liquid combustibles, if desired. Carbon monoxide, hydrogen, butane, propane, and the like, are mentioned as illustrative examples of suitable gases. The combustion-supporting gas is generally air, although other oxygen carriers may be used. The combustion occurs in direct contact with the solids in the heater and in the heater shown on FIGURE 1, these combustion products are withdrawn from the vessel through the conduit 16 at the top of the vessel and the conduit 17 at the bottom of the vessel. By this heating, the solids are heated to the desired high temperatures, such as 2000° F., and these hot solids are then passed as a compact mass through the reactor 14. The reactants are introduced into a reactor 14, through the conduit 9 and contact the hot solids in the reactor for the desired period of time. The reaction products formed by the thermal conversion in direct contact with the solids are removed from the reactor through the conduit 18. For example, ethane may be introduced into contact with the hot solids and ethylene and other gases removed from the vessel after conversion. The solids are removed from the bottom of the reactor 14 through the conduit 19 and introduced into the lower end of the elevator 10 for transfer back to the top of the heater 12. This process may be maintained in continuous operation for long periods of time and provides a continuous thermal conversion and continuous production of the desired products.

FIGURE 2 shows in vertical cross-section, a heater suitable for use in place of the heater 12 shown on FIGURE 1, and illustrates in more detail the essential aspects of this invention. The solids are introduced from the conduit 11, into the top of the heater 12 and, as shown, spread laterally to form a compact mass of solids in the vessel, the surface formed at the top of the vessel being at the angle of repose of the solid material. At an intermediate point in the vessel 12 is located a substantially horizontal partition member 20 which spans the entire cross-section of the vessel. Attached to and depending from this partition member 20 is a series of substantially vertical cylindrical members or conduits 21 which are, more or less, uniformly distributed through the entire cross-section of the partition. These members provide conduits through which the granular solids may be transferred from above the partition to a level below the partition. The total cross-section of the conduits 21 is made substantially less than the total cross-section of the vessel 21 so that the solids, in passing through these conduits, must increase in downward velocity a substantial extent over the downward velocity of the particles substantially above and below the partition member 20. Within certain limitations, the downward velocity of the particles within these conduits may be controlled by appropriate selection of the ratio of cross-section of the conduits to cross-section of the vessel and such control is essential to the proper functioning of the apparatus depicted on FIGURE 2. The gas pipe 15 is seen to enter the vessel 12 and attached and connected to this gas pipe are the downwardly-extending pipes 22, which are terminated substantially centrally within the solids transfer conduits 21 and, preferably, are terminated at or near the bottom of these conduits. The mixture of combustible gas and combustion-supporting gas is heated during transfer through these pipes. Therefore, combustion occurs during transfer of the gas through these pipes. This causes a continuous supply of heat to be transmitted through the walls of the pipes 22, which would be excessive but for the arrangement shown by this invention. The rapidly moving solid particles in the conduits 21 surrounding the lower ends of the gas pipes 22, provide an ideal means of taking up the heat transmitted through the walls of the pipes 22 and the solids in the conduits 21, provide a suitable heat carrier for rapidly transferring heat away from the lower ends of the pipes 22 and distributing this heat throughout the lower portion of the heater 12 in the lower compact bed shown at 23 on FIGURE 2. The heat carrying ability of the granular solids is, therefore, used to prevent the formation of a localized high temperature region around the lower ends of the gas pipes 22 and thereby prevents overheating of these pipes and the surrounding metal members. This avoids the need for any ceramic or refractory material at the location of the introduction of combustible gases into the solids bed.

The gas distributed from the lower ends of the gas pipes 22 may proceed downwardly through the compact bed 23 and combustion may continue during this transfer. At the base of the heater 12, is located one or more gas withdrawal channels 24, which may be inverted trough type channels of the type commonly used in vessels of this class. The gas is withdrawn from the channels 24 through a gas discharge pipe 17 and either discharged to atmosphere or used in other apparatus. The remaining portion of the combustion gases may pass upwardly around the gas pipes 22 and through the conduits 21 to contact the downwardly moving bed of solids as shown at 4 of FIGURE 2. The gas is withdrawn at the top of the vessel from the surface of the bed 4 and is discharged from the top of the vessel through the conduit 16 similarly as it is discharged from the bottom of the vessel to the conduit 17. As an alternate system for flowing the gas upwardly from the lower end of the gas pipes 22 and to prevent an excessive amount of gas being passed in countercurrent flow with the gravitating solids in the conduits 21, vertical gas transfer pipes 25 are located vertically above the partition 20 at locations intermediate the gas pipes 22. The gas pipes are uniformly distributed across the partition 20. These gas transfer pipes permit gas to travel from the lower ends of the gas pipes 22 upwardly through the plenum zone surrounding the solids transfer conduits 21 and through the gas transfer pipes 25, into the lower portion of the bed of solids 4. Suitable conical hoods 26 are located above the upper end of the gas transfer pipes 25 so as to baffle the flow of gravitating solids away from the tops of the transfer pipes 25, thereby preventing flow of solids through these pipes.

FIGURE 3 shows an alternate arrangement in which the combustion gases are introduced into the top of the heater 12 through the conduit 15 and are discharged from the vessel through a single outlet 17 in the lower portion of the vessel. In this arrangement, the partition member 20 is located closer to the upper end of the vessel and the supply of contact material suported on the partition member 20 is to provide a sufficient amount of the solid contact material for use as a heat transfer medium to prevent overheating of the pipes 22 attached to the combustion gas pipe 15, as well as the conduits 21 attached to the partition member in a location about the lower end of the gas pipes 22. By this expedient, it is not necessary to use the expensive and cumbersome ceramic materials about the gas pipes 22 or about related apparatus internals. This provides a substantially easier and cheaper construction for use in these heating vessels and, furthermore, permits a more uniform temperature of the solid materials in that the heat is rapidly transferred from the hottest region in the vessel to the cooler portions thereof. In the embodiment shown on FIGURE 3, the gas after being discharged from the conduits 22, moves downwardly in concurrent flow with the solids through the mass of solids further heating the solids and effecting combustion of any carbonaceous contaminants present on the surface of the solids. After passage through a bed of solids deep enough to provide the desired combustion and heating of the solids, these combustion gases are removed through the channels 24 and discharge pipe 17. The hot solids are then withdrawn from the bottom of the heater 12 through the pipe 13 for immediate introduction into the top of the reaction vessel, not shown.

This invention uses the good heat carrying ability of the solids used in these moving bed thermal processes by baffling the flow of solids about the gas introduction pipes to provide a sudden increase in the flowing velocity of the particles about the lower ends of the pipes, thereby effectively scrubbing the heat away from these pipes at a rate sufficient to prevent excessive temperature rise in the gas pipes. It is obvious that other schemes for baffling the flow of solids about the lower ends of the gas pipes so as to effectively provide the desired increase in velocity of solid particles about the lower ends of these pipes may be utilized and the invention is not intended to be limited to these specific arrangements shown on the figures. It is contemplated that alternate arrangements may be used. For example, the conduits 21 need not be circular in cross-section and they may be extended or shortened as desired to provide the temperature adjustment. The partition 20, of course, need not be perfectly flat, although this may be the easiest construction to build and install. It is seen that by this arrangement the apparatus for introducing the combustible gases into contact with the granular inerts has been simplified considerably over the apparatus used formerly and found in the prior art. It is not intended, therefore, that the invention be limited to the specific embodiments shown and described hereinabove, since these embodiments are so disclosed merely to illustrate the invention. The only limitations intended are those contained in the attached claims.

I claim:

In a thermal conversion process in which a granular contact material is passed as a compact gravitating mass through a heating zone in which a mixture of air and combustible gas is continuously introduced and burned in contact with the particles to substantially raise the temperature of the granular material to approximately 2000–3000° F. and in which the granular contact material at this elevated temperature is passed as a compact gravitating mass through a reaction zone in which saturated hydrocarbons are continuously introduced to contact the granular material, extract heat from the granular material, thereby substantially cooling the the granular material, and be transformed from saturated to unsaturated hydrocarbons, the improved method of introducing the mixture of air and combustible gas into the heating zone which comprises: introducing the contact material into the heating zone as it is discharged from the reaction zone at a temperature substantially below that required for effecting the conversion reaction of the saturated hydrocarbons to the desired unsaturated hydrocarbons, gravitating the granular contact material downwardly in said zone as a substantially compact mass, baffling the flow of contact material in said zone to direct the solid particles through vertical flow paths of substantially restricted cross-section, whereby the vertical velocity of the stream of granular material is substantially increased, introducing the mixture of combustible gas and air into said compact mass of granular material through laterally confined flow passages which terminate centrally within the flow paths of restricted cross-section, whereby heat produced by combustion of the gaseous mixture in the passages is rapidly carried away from the passages by the rapidly moving stream of solid granular material, the heat transfer effected thereby being sufficient to protect the passages from heat damage, discharging the granular material and the combustion gases from said restricted flow paths into a combustion region of substantially greater horizontal cross-section whereby the vertical velocity of the gravitating granular material is substantially reduced, the combustion of the combustible gases is completed and the temperature of the granular material is substantially increased to the desired approximately 2000–3000° F. range, withdrawing the combustion gaseous products from the heating zone and transferring the highly heated granular material from the bottom of the heating zone to the reaction zone.

References Cited in the file of this patent

UNITED STATES PATENTS

| | | |
|---|---|---|
| 2,526,625 | Ardern | Oct. 24, 1950 |
| 2,543,070 | Shabaker | Feb. 27, 1951 |
| 2,543,742 | Evans | Feb. 27, 1951 |
| 2,775,635 | Bearer | Dec. 25, 1956 |